No. 654,353.
T. OLDHAM.
CULTIVATOR.
(Application filed Mar. 10, 1900.)
Patented July 24, 1900.
(No Model.)
2 Sheets—Sheet 2.
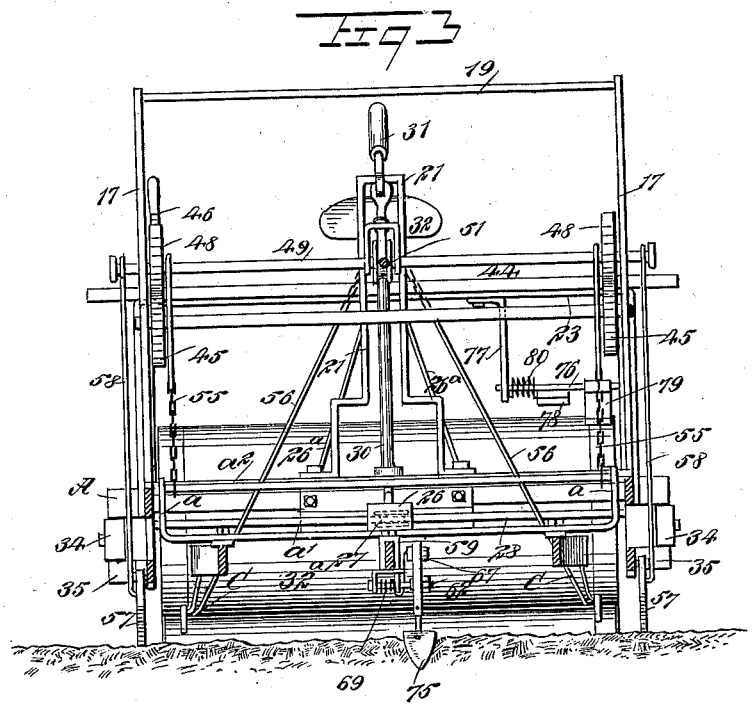
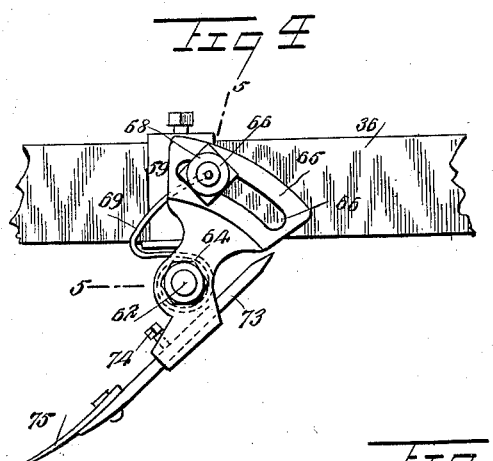
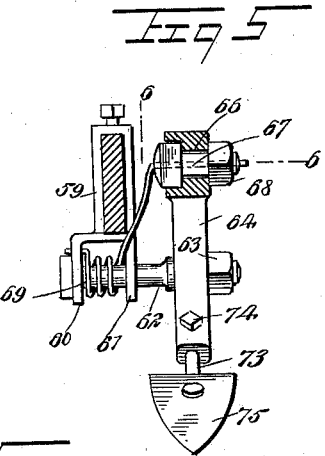
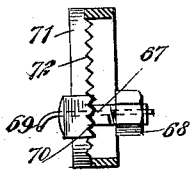
WITNESSES:
INVENTOR
Thomas Oldham
BY
ATTORNEYS
THE NORRIS PETERS CO., PHOTO-LITHO., WASHINGTON, D. C.

UNITED STATES PATENT OFFICE.

THOMAS OLDHAM, OF LEIPSIC, INDIANA.

CULTIVATOR.

SPECIFICATION forming part of Letters Patent No. 654,353, dated July 24, 1900.

Application filed March 10, 1900. Serial No. 8,155. (No model.)

*To all whom it may concern:*

Be it known that I, THOMAS OLDHAM, a citizen of the United States, and a resident of Leipsic, in the county of Orange and State of Indiana, have invented a new and useful Improvement in Cultivators, of which the following is a full, clear, and exact description.

One object of the invention is to provide an agricultural implement in which devices are combined for plowing, harrowing, dragging, and rolling the soil, the said devices being so constructed that by removing or adjusting various parts the implement may be adapted for all manner of farmwork in the field.

Another purpose of the invention is to so construct the machine that the draft will be light and regular and so that the machine may be conveniently and readily managed.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a longitudinal vertical section taken substantially on the line 1 1 of Fig. 2. Fig. 2 is a plan view, parts being in horizontal section, which section is taken practically on the line 2 2 of Fig. 1. Fig. 3 is a vertical transverse section taken practically on the line 3 3 of Fig. 1. Fig. 4 is a side elevation of a portion of a beam and a side elevation of one of the devices employed for holding a harrow-tooth or shovel in connection with the beam. Fig. 5 is a section taken practically on the line 5 5 of Fig. 4, and Fig. 6 is a section taken on the line 6 6 of Fig. 5.

The frame A of the machine is preferably tapered at the front, so that its sides at that portion are inclined rearwardly in opposite directions, and the frame is provided with an upright extension 10 near the rear and with a rear circular portion 11. At the front portion of the frame projections 12 are formed, in which a vertical shaft 13 is mounted to turn, and this shaft carries a wheel 14. The shaft is provided between the projections 12 with a clevis 15, in which apertures 16 are produced. The shovels or teeth of the implement may be made to enter the ground to a greater or less extent, according to the aperture in the clevis, into which the draft device is introduced. At or near the central portion of each side of the frame an upright 17 is formed, having a longitudinal slot 18 in its upper portion, and these uprights 17 are usually connected at the top by a cross-bar 19, as shown in Fig. 1. A cross bar or plate 20 connects the frame A at the rear of the uprights 17, and upon this cross bar or plate 20 a vertical yoke 21 is centrally secured.

A platform 22 extends from one side projection 10 of the frame to the other, and an auxiliary frame B is pivotally connected with the said platform through the medium of a suitable pin located at the center of the platform. This frame B consists of a horizontal body-bar 23, downwardly-extending arms 24 at the end portions of the said body-bar, and a yoke-section 25, which is connected with the downwardly-projecting arms 24 at the lower ends of said arms, and the said yoke is located slightly at the rear of the cross bar or plate 20. The yoke-section 25 of the auxiliary frame B is provided at its center with a forwardly-extending member 26, which is carried beneath and beyond the cross bar or plate 20 and is provided at its outer end with a friction-roller 27. This friction-roller 27 is made to travel upon a curved horizontal track 28, extending from side to side of the main frame, and serves to guide the auxiliary frame B in its movement, as the auxiliary frame B is adapted to be turned to the right or to the left. This movement of the auxiliary frame is accomplished by means of a crank 29, forming a portion of a shaft 30, which crank enters a suitable slot in the forward projection 26 from the auxiliary frame B, while the shaft 30 extends upward through and is journaled in the vertical yoke 21, forming a portion of the main frame of the machine, and the shaft 30 is preferably provided at its upper end with a pivoted handle 31, extending in direction of the driver's seat 32, the latter being mounted upon the platform 22. The handle 31 of the shaft 30 is so pivoted that it may be raised up and carried out of the way of the driver's seat when necessary. Suitable braces 26ª are provided for the forward portion of the auxiliary frame B, connecting the upper member 22 thereof with the forward yoke member 25. A roller 32ª is carried by the auxiliary frame B, and this roller is firmly secured in any suitable manner upon a shaft 33, journaled in the pendent members 24 of the auxiliary frame B, and the shaft 33 is provided with a friction-roller 34 at each end, which rollers are mounted to travel on segmental tracks 35, located at each side of the frame of the machine. Thus it will be observed that the machine is supported by the forward wheel 14 and the rear roller 32ª and is guided by moving the rear roller 32ª to the right or to the left, as occasion may demand.

A cultivator-frame C is carried by the main frame A of the machine. This cultivator-frame C consists of two outside beams 36, which are at angles to each other, and a central beam 37. These beams connect at their forward portions, and where they connect an eye 38 is formed, which eye receives a shaft or pin 39, located at the forward central portion of the main frame, being held in a bracket 40, which extends both above and below said main frame, as particularly shown in Fig. 1. The outer beams of the cultivator-frame C are connected by links 41 or their equivalents with a drag D. This drag consists of side bars 42 and bottom plates 43, which bottom plates are attached to the side bars and extend downward and rearward, being adapted at their lower edges for engagement with the ground, as shown in Fig. 1. The cultivator-frame C and the drag D are raised and lowered by the following mechanism: A shaft 44 is mounted to turn in the uprights 17, and between the said uprights toothed segments 45 are secured to the said shaft 44, one of which segments 45 is provided with an attached lever 46, having a suitable thumb-latch for engagement with a rack 47. A shaft 49 is located above the shaft 44, and the shaft 49 is adapted to slide in the slots 18 of the uprights 17. The shaft 49 is provided near each end with toothed segments 48, secured thereto, and the teeth of the segments 48 are arranged for engagement with the teeth of the segments 45 on the shaft 44. The convexed surfaces of these segments are in opposition, as shown in Fig. 1. A pulley 50 is secured upon the vertically-adjustable shaft 49, and an equalizing-rod 51 is made to rest upon the said pulley, the inner end of which rod is pivotally attached to the upright yoke 21 of the main frame of the machine, as shown in Fig. 1, and the forward end of the equalizing-rod 51, which extends downward beyond the pulley 50, is connected by a link 52 and a chain 53 or their equivalents with the upper central portion of the cultivator-frame C.

The cultivator-frame is guided in its upward movement by means of uprights a, carried from the ends of a cross-bar a', attached to the cultivator-frame at or near its center, and a rod $a^2$ is passed through these guides a, while a link-and-chain connection 55 is provided between the rod $a^2$ and the vertically-adjustable shaft 49. Links 56 and suitable lengths of chain are also employed to connect the rear end portion of the drag D with the equalizing-bar 51, so that as the shaft 49 is raised or lowered by manipulating the lever 46, which is convenient to the driver's seat, both the drag and the cultivator-frame may be raised or lowered, as occasion may demand.

Guards 57, in the form of runners, are pivoted at their forward ends to the outer side surfaces of the main frame A, and the free ends of these guards or runners are connected by links 58 or their equivalents with the end portions of the vertical shaft 49, so that these guards or runners are raised or lowered simultaneously with the corresponding movement of the cultivator-frame and drag.

The cultivator teeth or shovels, whichever are to be employed, are attached to the beams of the cultivator-frame in a peculiar manner or so that they may be adjusted as to inclination and will yield when they strike a stone or similar obstruction, which might otherwise break them. To this end clips 59 are secured upon the beams of the cultivator-frame, as shown in Fig. 5, and each clip is provided with members 60 and 61, which extend below the beam, as is shown also in Fig. 5. A bolt 62 is passed through these downwardly-extending members of the clip, and a receiving-plate 64 is mounted upon the outer end of each bolt 62, held in position by suitable collars on said bolts 62 and by nuts 63. The receiving-plates are free to rock on their supporting-bolts 62. Each receiving-plate is provided with an upper enlarged section or head 65, in which a transverse curved slot 66 is produced, and a short tubular bolt 67 is passed through the slot 66 in each receiving-plate, while a nut 68 is located at the outer end of each of the tubular bolts 67, as shown in Figs. 4, 5, and 6. A spring 69 is coiled around each bolt 62 between the downwardly-extending members of the clips 59, and each spring 59 has bearing against one member of the clip, while the other end of the spring is carried upward and is passed through the bore in the tubular bolt 67, as is principally shown in Figs. 4, 5, and 6. Thus it will be observed that the spring 69 serves to control or regulate the position of the receiving-plate with which it is connected, and when the said plate has been adjusted to carry the shovel or tooth received by it into the ground should the tooth or shovel engage with a stone or other obstruction which it cannot remove the spring 69 will give, and said tooth or shovel will thus be preserved from injury. A rabbet or recess 71 is made in the inner face of the head of each receiving-plate, and the inner wall of this recess or rabbeted surface 71 is provided with teeth 72, which teeth are adapted to engage with corresponding teeth 70, produced upon the head of the tubular bolt 67, so that the said tubular bolt may be adjusted in the head of the receiving-plate to which it belongs to impart more or less inclination to said receiving-plate. Each receiving-plate is provided below its pivot with a socket, and this socket receives a shank 73, having one end sharpened, so that it may be used as a tooth, and the shank is adjustably secured in the socket by a set-screw 74 or its equivalent, and at one end of each shank 73 a cultivator-shovel 75 is secured in any suitable or approved manner.

It is frequently necessary that a brake should be provided for the roller 32ª. To that end a shaft 76 is journaled in a bracket 77, extending downward from the upper or body member 23 of the rear auxiliary frame B, and this shaft 76 is provided with an attached foot-lever 78 and with a shoe 79, arranged for engagement with the roller 32ª, when the foot-lever is depressed; but normally the shoe is held out of engagement with the said roller through the medium of a spring 80, coiled around the shaft 76, as is shown in Fig. 3. The roller may be readily removed by withdrawing its shaft, and the cultivator-frame and drag may likewise be readily detached when not required.

Having thus described my invention, I claim as new and desire to secure by Letters Patent—

1. In an agricultural implement, a main frame, a cultivator-frame, a drag and a roller carried by the main frame, the drag being between the roller and the cultivator-frame, and means for raising and lowering the drag and the cultivator-frame and for guiding the roller to the right or to the left, as described.

2. In an agricultural implement, a main frame wheel-supported at its forward end, a roller pivoted at the rear end of the frame, means for turning the said roller, a brake for the roller, a cultivator and drag carried by the main frame between its forward wheel-support and the roller, and means for simultaneously raising and lowering the drag and cultivator-frame, as described.

3. In an agricultural implement, a main frame, a supporting-wheel for the forward end of the main frame, an auxiliary frame pivotally attached to the rear portion of the main frame, a roller carried by the said auxiliary frame, a lever operated from the main frame and arranged to turn the auxiliary frame to the right or to the left, a cultivator-frame pivotally attached to the forward portion of the main frame and capable of vertical movement, a drag connected with the cultivator-frame, an adjusting-shaft connected with the drag and the cultivator-frame, and means for raising and lowering the said shaft.

4. In an agricultural implement, the combination, with a main frame, a supporting-wheel located at the forward portion of the main frame, the shaft of the wheel having an attached clevis, an auxiliary frame pivoted to the main frame at the rear, a lever connected with the auxiliary frame and adapted to move the same to the right or to the left, a roller-guide for the auxiliary frame, a shaft carried by the said auxiliary frame and having rollers adapted to travel on tracks formed on the main frame, and a roller arranged for engagement with the ground and carried by the said shaft, of uprights carried by the main frame, a shaft having vertical movement in the said uprights, an equalizing-bar supported by said shaft, toothed segments carried by the adjustable shaft, a shaft mounted to rotate below the adjustable shaft and having toothed segments adapted for engagement with those on the adjustable shaft, means for rocking the rotary shaft, a cultivator-frame pivotally and adjustably carried by the main frame, a drag also carried by the main frame, and connections between the cultivator-frame and drag and the equalizing-bar, and the cultivator-frame and the adjustable shaft, as specified.

5. In an agricultural implement, the combination, with a main frame, a supporting-wheel located at the forward portion of the main frame, the shaft of the wheel having an attached clevis, an auxiliary frame pivoted to the main frame at the rear, a lever connected with the auxiliary frame and adapted to move the same to the right or to the left, a roller-guide for the auxiliary frame, a shaft carried by the said auxiliary frame and having rollers adapted to travel on tracks formed on the main frame, and a roller arranged for engagement with the ground and carried by the said shaft, of uprights carried by the main frame, a shaft having vertical movement in the said uprights, an equalizing-bar supported by said shaft, toothed segments carried by the adjustable shaft, a shaft mounted to rotate below the adjustable shaft and having toothed segments adapted for engagement with those on the adjustable shaft, means for rocking the rotary shaft, a cultivator-frame pivotally and adjustably carried by the main frame, a drag also carried by the main frame, and connections between the cultivator-frame and drag and the equalizing-bar and the cultivator-frame and the adjustable shaft, guards in the form of runners pivotally attached to the side portions of the main frame and located where the drag and the cultivator-frame connect, and means for lifting the said guards when the adjustable shaft is raised and lowered, as described.

6. In an agricultural implement, the combination, with a beam, a clip secured to the said beam and a bolt carried by the said clip, of a receiving-plate mounted to rock on said bolt, said receiving-plate having a slotted head and a toothed recess in one side of the head, the said plate being likewise provided with means for receiving a shovel-shank or a harrow-tooth, a tubular bolt passed through the slot in the head portion of the receiving-plate and having a serrated surface for engagement with the toothed surface of the said head, a spring coiled around the pivot-bolt of the receiving-plate and having bearing at one end against a fixed support independent of the receiving-plate, the other end of the spring being passed through the bore in the tubular bolt, as and for the purpose set forth.

In testimony whereof I have signed my name to this specification in the presence of two subscribing witnesses.

THOMAS OLDHAM.

Witnesses:
JONCE MONYHAN,
CHARLES P. COLLINS.